Dec. 16, 1952 C. G. SONTHEIMER 2,622,146

AUTOMATIC FREQUENCY CONTROL CIRCUIT FOR TELEVISION

Filed Dec. 15, 1945

INVENTOR.
CARL G. SONTHEIMER
BY
N. G. Grover
ATTORNEY

Patented Dec. 16, 1952 2,622,146

UNITED STATES PATENT OFFICE 2,622,146

AUTOMATIC FREQUENCY CONTROL CIRCUIT FOR TELEVISION

Carl G. Sontheimer, Riverside, Conn., assignor to Radio Corporation of America, a corporation of Delaware Application December 15, 1945, Serial No. 635,338

13 Claims. (Cl. 178—7.3)

This invention relates to an improvement in television receivers, and, more particularly, to a circuit arrangement whereby it is possible to exercise automatic frequency control in a television receiver where a frequency modulated radio frequency carrier is received.

In the transmission of sound programs by frequency modulation of a radio frequency carrier, automatic frequency control can conveniently be employed at the receiver for assuring that the receiver remains properly tuned to the radio frequency carrier in the presence of slight transmitter or receiver local oscillator frequency drift. When sound programs are transmitted by frequency modulation of a radio frequency carrier, the modulation envelope or the frequency deviations in each direction from a relatively fixed central or mean frequency are substantially identical, with the result that the received radio frequency energy is substantially symmetrical with respect to a central or mean frequency. In frequency modulation receivers that are adapted to receive such signals, it is common practice to provide a balanced discriminator, the output of which is zero if the receiver is in proper tune. Should the receiver be slightly off tune on one side or the other, a positive or negative direct current potential will be developed which may be used, in conjunction with a reactance tube or similar circuit, for controlling the frequency of oscillation of a local oscillator to retune the receiver to the right point. Such a device will insure that the receiver, or more accurately the balance point of the discriminator, is tuned to the alternating current axis of the received signal.

In the event that the received signal is asymmetrical and is of varying waveform, as is the case in the transmission of television image or video signals, the alternating current axis of the received signal does not stay relatively fixed as is the case where the signal is symmetrical, but, instead, shifts from one edge of the transmission band to the other, depending upon the particular waveform transmitted. For example, if full white is to be transmitted at one particular radio frequency and the peaks of the synchronizing impulses are to be transmitted at another particular radio frequency (the difference between these frequencies representing the permitted deviation band) then the radio frequency corresponding to the alternating current axis of the television image or video signal does not stay fixed at some particular point between the two deviation extremes but instead shifts in accordance with the image content and the average light condition of the scene to be transmitted. For instance, if a predominantly black picture or image is being transmitted, the alternating current axis and the radio frequency carrier corresponding to this axis will be much closer to the radio frequency corresponding to the peaks of the synchronizing impulses than would be the case if a predominantly white picture were transmitted.

Under such conditions where the alternating current axis of the signal does not remain fixed, the carrier frequency corresponding to the alternating current axis of the signal correspondingly does not remain fixed. If the conventional balanced discriminator were employed for producing an automatic frequency control potential, satisfactory results could not be obtained unless the receiver band width were made excessively wide (up to twice the total transmitted band width of the received signal) in order to accommodate the inherent shifting of the alternating current axis and the carrier frequency corresponding thereto. Cost is increased and signal to noise ratio diminished when the receiver bandwidth is thus widened.

The present invention overcomes these difficulties and makes it possible to design a receiver whose band width corresponds to the transmission band, by providing a circuit arrangement whereby it is possible to derive an automatic frequency control voltage from a fixed radio frequency reference point in the deviation band so that the shifting of the alternating current axis is of no moment. This fixed reference point is preferably chosen at one extreme edge of the transmitted frequency band, i. e., one extreme deviation limit. This can be done in the transmission of television signals since the synchronizing signals extend in the direction of black and have an intensity greater than any signal corresponding to black. Furthermore, the synchronizing signals are always transmitted in a consistent manner and the peaks of the synchronizing impulses are always represented by the same frequency of the radio frequency carrier. The peaks of the synchronizing impulses, therefore, define one of the frequency deviation limits of the transmission band and this limit is independent of the average light content of the image transmitted.

In accordance with the present invention, therefore, a discriminator is employed which responds to the intermediate frequency present in the receiver during the transmission of the synchronizing impulses. This discriminator, which produces a voltage that is a function of the intermediate frequency corresponding to the synchronizing impulses, therefore affords a means for developing a usable automatic frequency control potential. This potential may then be used to control the frequency of operation of the local oscillator in the receiver in order to maintain a desired tuning condition.

One of the purposes of the present invention, therefore, resides in the provision of means in a frequency modulation receiver whereby an automatic frequency control potential may be developed even though the transmitted waveform is asymmetric.

A further purpose of the present invention resides in the provision of means in a frequency modulation receiver for developing automatic frequency control potentials even though the alternating current axis of the transmitted waveform does not remain relatively fixed.

Another purpose of the present invention resides in the provision of means in a frequency modulation television receiver for developing an automatic frequency control potential as a function of the intermediate frequency carrier corresponding to an intermittently repeated portion of the transmitted waveform.

A still further purpose of the present invention resides in the provision of a circuit arrangement for producing automatic frequency control potentials in a frequency modulation television receiver in which the potentials are developed as a function of the intermediate frequency carrier corresponding to the peaks of the synchronizing impulses.

Still other purposes and advantages of the present invention will become more apparent to those skilled in the art from the following detailed description, particularly when considered in connection with the drawings wherein.

Figure 1:
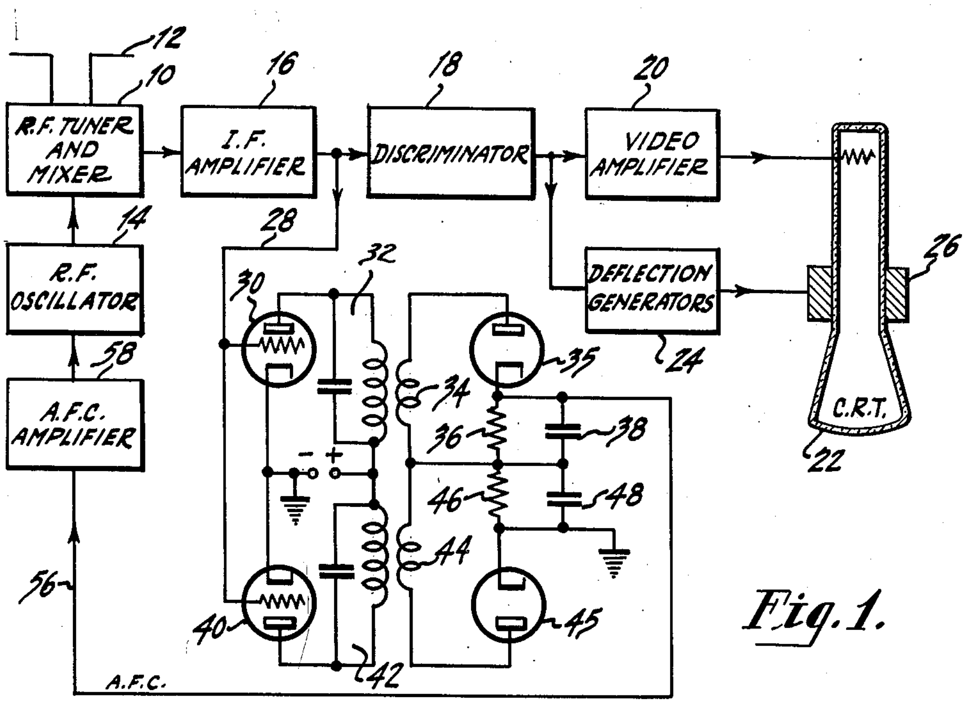
Figure 1 represents a preferred form of the present invention.

Referring now to the drawings and more particularly to Figure 1 thereof, there is shown a television receiver including a radio frequency tuner and mixer represented at 10. The radio frequency carrier is received by the antenna 12 and when mixed with the oscillations from the local radio frequency oscillator 14 produces an intermediate frequency carrier which is applied to the intermediate frequency amplifier 16. The intensity of the intermediate frequency carrier is increased by the amplifier 16 and a limiter may be included in the circuit in order to suppress any undesired amplitude modulations that may be present. The output from the intermediate frequency amplifier 16 is then applied to a discriminator 18. The video signals from the discriminator are supplied to the video amplifier 20 which in turn directs the amplified video signals to the control electrode of the cathode ray receiver or image producing tube 22. Deflection generators 24 are also provided and these elements respond to the synchronizing impulses to supply the deflection voltage variations to the deflection yoke 26 associated with the cathode ray tube 22.

For developing the automatic frequency control potential, energy is derived from the intermediate frequency amplifier by way of conductor 28. These signals are applied to the control electrodes of tubes 30 and 40. The tubes each include at least a cathode, a control electrode and an anode. The anode circuit of tube 30 includes a tuned circuit 32 with which is associated winding 34 for supplying the intermediate frequency carrier to a diode 35. The load circuit for the diode is the cathode resistance 36. This load resistance 36 has a condenser 38 connected in parallel therewith.

Similarly, tube 40 includes in its anode circuit a tuned circuit 42 with which is associated winding 44 for supplying intermediate carrier energy to the diode 45. The diode 45 has for its load circuit resistance 46 and a condenser 48 which is connected in parallel with this load resistance. The characteristics of the tuned circuits 32 and 42, together with the time constants of the resistors and condensers associated with the cathodes of the diodes 35 and 45 will be explained later.

Figure 2:
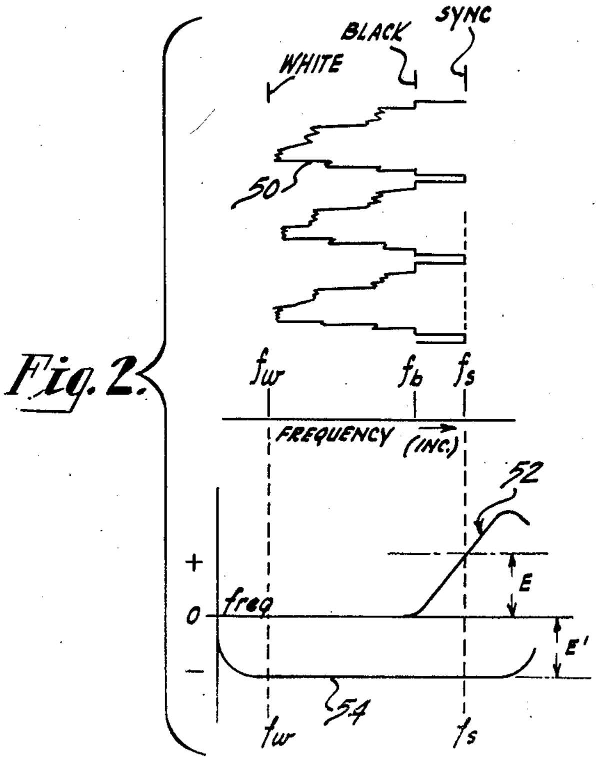
Figure 2 shows curves used in explaining the operation of the circuit arrangement shown in Figure 1.

Referring now to Figure 2, there is shown a curve 50 which represents the frequency deviations of the radio frequency carrier when television signals are transmitted. This same frequency deviation exists in the intermediate frequency amplifier channel. For the purpose of explaining the present invention, it will be assumed that the intermediate frequency corresponding to full white in the picture or image is $f_w$ while the intermediate frequency corresponding to full black in the picture or image is $f_b$. The frequency deviation which occurs during the transmission of the synchronizing impulses therefore places the intermediate frequency at $f_s$ during the transmission of a synchronizing impulse. The deviation limits, therefore, extend from $f_w$ to $f_s$ and it will further be assumed that this is in an increasing frequency direction. The synchronizing impulses, therefore, are transmitted at the highest frequency present in the signal band.

The discriminator transformer including the tuned circuit 32 is chosen to have a rising characteristic with frequency and a point substantially midway along the slope of the characteristic curve is caused to coincide with the frequency $f_s$ present during the transmission of synchronizing impulses. This rising characteristic of the discriminator associated with tube 30 is represented by curve 52 of Figure 2. If the time constant of the resistance 36 and the condenser 38, associated with the diode 35, is high compared to a television line interval, then the voltage present across resistance 36 will not depend upon picture content (i. e. frequencies between $f_w$ and $f_b$) but will depend only upon the frequency corresponding to the peaks of the synchronizing impulses and the intensity of the signals during these synchronizing intervals. The voltage present across the resistance 36 is represented at E in Figure 2.

If the discriminator coupling circuit associated with tube 40 has a flat frequency characteristic over the entire signal band as represented by curve 54 of Figure 2 and if the time constant of resistance 46 and condenser 48 is large compared to a television line interval, then the voltage E' (Figure 2) developed across resistance 46 will be a function of the signal intensity only, over the entire band, and will not depend upon receiver tuning. It is preferable that the discriminator associated with tube 40 respond uniformly to all frequencies throughout the transmission band and preferably throughout a band slightly in excess of the transmision band.

The characteristics of the two transformers 32—34 and 42—44 are different. Transformer 32—34 is so designed that with its associated components a response curve similar to that represented at 52 in Fig. 2 may be obtained. Furthermore, as explained above, the design of transformer 42—44 and its associated circuits is such that a response, such as represented by curve 54 of Fig. 2, may be obtained. These transformers are so designed as to pass different band widths and, accordingly, the Q of the windings of the transformers are different. It is well known to those skilled in the art that transformers with tuned circuits may be caused to pass a desired band of frequencies in accordance with the parameters and design of the transformer and tuned circuit. It is possible that in actual practice the primary winding 42 of transformer 42—44 may have a resistance in parallel therewith, in order that its pass band may be increased. The resistance may in fact not be necessary if a winding of the proper size wire is employed.

It follows, therefore, that if the above conditions are satisfied and if the characteristics of the discriminators are properly chosen, the differential potential developed by the diodes will be zero regardless of signal amplitude whenever the synchronizing impulses correspond to a definite intermediate frequency such as $f_s$ in Figure 2 (the assumed upper frequency limit of the band.) The voltages E and E′ are made differential by obtaining the output between the two cathode resistances of the diodes 35 and 45. For convenience in Figure 1, the cathode of the diode 45 is shown as grounded or connected to a point of fixed potential so that the potential available from the cathode of diode 35, and present on conductor 56, will be the differential of the voltages E and E′ produced across load resistors 36 and 46, respectively.

If, for some reason, the tuning of the television receiver should change or if the radio frequency oscillator 14 should drift during operation, the intermediate carrier frequency that is present during synchronizing impulses would not correspond to $f_s$ but would be a frequency higher or lower than the desired frequency. This would cause the voltage E to change in one direction or another with the result that a corresponding change would be present on the automatic frequency control conductor 56. It is possible for the circuit arrangement to be so adjusted that when the receiver is in exact proper tuning, voltages E and E′ are exactly equal in intensity and opposite in polarity. Under such a condition, the potential on conductor 56 would be zero. Should the oscillator 14 then drift, a positive or negative potential would be developed on conductor 56 depending upon the direction of the drift and the extent or intensity of the voltage would be a function of the extent and degree of frequency drift.

This automatic frequency control potential is then preferably applied to an automatic frequency control amplifier 58 in order to increase the intensity of the signals, where necessary, and the signals are then applied to any desired circuit arrangement that is effective to control the frequency of operation of the local oscillator 14 in order to return the receiver to its proper tuning condition.

Since the voltage developed across the resistance 46 is a function only of the signal intensity (and not the frequency deviations) it is apparent that if the receiver has sufficient gain to make a limiter completely effective, then tube 40 and the discriminator and diode 45 associated therewith may be completely eliminated and replaced with a bias voltage or source of potential of a magnitude equal to the voltage developed across resistance 46. This is by reason of the fact that if the limiter is completely effective, the intensity of the signals present on conductor 28 will always remain constant regardless of the frequency modulations and under these conditions the voltage developed across resistance 46 will remain constant. A fixed potential can, therefore, be substituted for the voltage normally present across resistance 46. In the absence of a completely effective limiter, it is preferable to include the tube 40 and its associated circuit in order that any changes in the intensity of the signals applied to tube 30 will not produce erroneous automatic frequency control potentials.

It will also be obvious to those skilled in the art that if the output from the intermediate frequency amplifier 16 is sufficiently high, the amplifier tubes 30 and 40 may be combined into one tube, or else omitted altogether. If they are combined, tuned circuits 32 and 42 are connected in parallel across the output of the single tube; if they are omitted, circuits 32 and 42 are connected in parallel with the signal discriminator 18.

Although the present invention is described as applicable to a television receiver where frequency modulated signals are received, it is entirely possible for the present invention to be employed in any respect when an asymmetrical frequency modulated signal is received, provided one of the frequency deviation limits is reached sufficiently often to permit the control potential to be developed and maintained across a time-constant circuit of reasonable proportions.

I claim:

1. A television receiver of the superheterodyne type for receiving a radio frequency carrier which has been frequency modulated by a television video signal including a heterodyne oscillator, a first discriminator having a sloping characteristic with frequency and responsive to frequency deviations near one edge of the deviation band to produce a potential of one polarity in response to the extent of the frequency deviations and in response to the intensity of the carrier, a second discriminator having a substantially uniform response characteristic over the entire deviation band to produce a potential in response to the intensity of the carrier only, the polarity of the potential produced by said second discriminator being opposite to that produced by said first discriminator, and means responsive to the differential of the two produced potentials for controlling the frequency of operation of the heterodyne oscillator.

2. A television receiver of the superheterodyne type for receiving a radio frequency carrier which has been frequency modulated by a television video signal including a heterodyne oscillator, a discriminator having a sloping characteristic with frequency and responsive to frequency deviations near one edge of the deviation band to produce a potential in response to the extent of the frequency deviations and in response to the intensity of the carrier, a circuit having substantially uniform frequency response characteristic over the entire deviation band to produce a potential in response to the intensity only of the carrier, the polarity of the second produced potential being opposite to that produced by said discriminator, and means responsive to the differential of the two produced potentials for controlling the frequency of operation of the heterodyne oscillator.

3. A television receiver of the superheterodyne type for receiving a radio frequency carrier which has been frequency modulated by a television video signal including a source of heterodyne oscillations, a discriminator having a sloping characteristic with frequency and responsive to frequency deviations near the edge of the deviation band representative of the synchronizing impulses to produce a potential in response to the extent of the frequency deviations during synchronizing impulse intervals and in response to the intensity of the carrier, means to produce a second potential commensurate with the intensity of the carrier only, and means responsive to the differential of the two produced potentials for controlling the frequency of the source of heterodyne oscillations.

4. A television receiver of the superheterodyne type for receiving a radio frequency carrier that has been frequency modulated by television video signals and in which the synchronizing impulses are represented by a predetermined frequency deviation in a particular direction comprising a radio frequency tuner including a local heterodyne oscillator for producing an intermediate frequency carrier, a discriminator having a sloping characteristic with frequency and responsive to the intermediate frequency deviations near the edge of the deviation band representing the synchronizing impulses to produce a potential of one polarity in response to the extent of the intermediate frequency deviations and in response to the intensity of the carrier, means to produce a second potential of opposite polarity commensurate with the intensity of the carrier only, and means responsive to the differential of the two produced potentials for controlling the frequency of operation of the local oscillator to control the tuning of the receiver.

5. A television receiver of the superheterodyne type for receiving a radio frequency carrier that has been frequency modulated by a television video signal including a radio frequency tuner including a local heterodyne oscillator for producing an intermediate frequency carrier, a first discriminator having a sloping characteristic with frequency and responsive to frequency deviations in the intermediate frequency channel near one edge of the deviation band to produce a potential in response to the extent of the frequency deviations and in response to the intensity of the intermediate frequency carrier, a second discriminator having a substantially uniform response characteristic over the entire deviation band to produce a potential in response to the intensity only of the intermediate frequency carrier, and means responsive to the differential of the two produced potentials for controlling the frequency of operation of the local oscillator thereby to control the tuning of the receiver.

6. A television receiver of the superheterodyne type for receiving a radio frequency carrier that has been frequency modulated by a television video signal including a tunable local heterodyne oscillator for producing an intermediate frequency carrier, a discriminator having a sloping characteristic with frequency and responsive to frequency deviations in the intermediate frequency channel near the edge of the deviation band representing the synchronizing impulses of the video signal to produce a potential of one polarity in response to the extent of the frequency deviations and in response to the intensity of the intermediate frequency carrier, a broad uniform response circuit for producing a potential of opposite polarity in response to the intensity only of the intermediate frequency carrier, and means responsive to the difference between the two produced potentials for controlling the frequency of operation of the local oscillator thereby to maintain accurate tuning of the receiver.

7. A super-heterodyne radio receiver for receiving a radio frequency carrier that has been frequently modulated by an unsymmetrical waveform in which the extent of the frequency deviation in a particular direction is uniform during cyclically repeated intervals, comprising a radio frequency tuner including a local heterodyne oscillator for producing an intermediate frequency carrier from the radio frequency carrier, a discriminator having a sloping frequency characteristic and responsive to the intermediate frequency deviations near the edge of the deviation band where the deviations are cyclically repeated to produce a potential having an intensity determined by the extent of the intermediate frequency deviations and also by the intensity of the intermediate frequency carrier, a source of potential having a value commensurate of the intensity only of the intermediate frequency carrier, and means responsive to the differential of the two potentials for controlling the frequency of operation of the local heterodyne oscillator to thereby insure proper automatic tuning of the receiver.

8. In a frequency modulation television system, a carrier wave source, the carrier wave supplied by said source being frequency modulated with both video and synchronizing intelligence, an oscillator of controllable frequency, means responsive to frequency variations within the deviation limits of the video intelligence components of said carrier wave for producing a first control voltage, said responsive means having a substantially flat frequency-response characteristic at frequencies within said video-intelligence deviation limits, means responsive to a frequency near the synchronizing-signal deviation limits of said carrier wave for producing a second control voltage, said last-mentioned responsive means having a steep frequency-response characteristic at frequencies near said synchronizing-signal deviation limits, and means for utilizing said control voltages differentially to control the frequency of said oscillator.

9. In a frequency-modulation receiver; an automatic-frequency-control system comprising a source of asymmetrically-frequency-modulated carrier signal including different modulation components, one of said components varying within a preassigned carrier frequency range, and another component extending outside said preassigned range; means including a beating oscillator for converting the carrier signal to a different frequency band; means for varying the frequency of said oscillator; means responsive to frequency variations of said first-named component of said converted carrier for so actuating said frequency-varying means as to urge the oscillator frequency in one direction, said responsive means having a substantially flat frequency-response characteristic throughout the range of frequencies of said first-named component as converted; and means responsive to said other component of said converted carrier for so actuating said frequency-varying means as to urge the oscillator frequency in the other direction, said last-named responsive means having a steep frequency-response characteristic at frequencies in the region of the converted frequency of said other component.

10. In a frequency-modulation television system employing a carrier wave which is frequency modulated with signals including video signals and synchronizing pulses, the wave frequency of said synchronizing pulses being outside the wave band of said video signals, the location of said modulated wave in the frequency spectrum being a function of the operating frequency of a controllable oscillator; means responsive to frequency variations of the video component of the carrier wave for producing a control voltage, said responsive means having a substantially flat frequency response characteristic throughout the range of said video component of said carrier wave; means responsive to a frequency in the neighborhood of the frequency of the synchronizing component of the carrier wave for producing another control voltage, said last-named responsive means having a steep frequency-response characteristic at frequencies in said neighborhood; and means for utilizing said control voltages differentially to control the frequency of said oscillator so as to maintain the black-level frequency of the carrier wave substantially constant.

11. In a frequency-modulation television system employing a carrier wave which is frequency modulated with signals including video signals and synchronizing pulses, the wave frequency of said synchronizing pulses being outside the wave band of said video signals, the location of said modulated wave in the frequency spectrum being a function of the operating frequency of a controllable oscillator; means responsive to frequency variaitions of the video component of the carrier wave for producing a control voltage, said responsive means having a substantially flat frequency response characteristic throughout the range of said video component of said carrier wave; means responsive to a frequency just beyond the frequency of the synchronizing component of the carrier wave for producing a control voltage of opposite polarity, said last-named responsive means having a steep frequency-response characteristic at frequencies beyond the frequency of the synchronizing component of the carrier wave; and means for utilizing both of said control voltages to control the frequency of said oscillator so as to maintain the black-level frequency of the carrier wave substantially constant.

12. In a frequency-modulation television system employing a carrier wave which is frequently modulated with signals including video signals and synchronizing pulses, the wave frequency of said synchronizing pulses being outside the wave band of said video signals, the location of said modulated wave in the frequency spectrum being a function of the operating frequency of a controllable oscillator; means for varying the frequency of said oscillator; means responsive to the video components of the carrier wave for actuating said frequency-varying means so as to urge the oscillator frequency in one direction, said responsive means having a substantially flat frequency response to said video components; and means responsive to synchronizing components of the carrier wave for actuating said frequency-varying means so as to urge the oscillator frequency in the other direction, said last-named responsive means having a steep frequency-response characteristic at frequencies near to said synchronizing components.

13. In a frequency-modulation television system employing a carrier wave which is frequency modulated with signals including video signals and synchronizing pulses, the wave frequency of said synchronizing pulses being outside the wave band of said video signals, the location of said modulated wave in the frequency spectrum being a function of the operating frequency of a controllable oscillator; means for varying the frequency of said oscillator; a frequency-variation response network having a substantially flat frequency response to video components of the carrier wave and arranged to receive a portion of the signal energy; a detector coupled to said network and adapted to produce a unidirectional control voltage of certain polarity; a frequency-variation response network having a steep frequency-response characteristic at frequencies just beyond the peak frequency of the synchronizing pulses of the carrier wave, said last-mentioned network also being arranged to receive a portion of the signal energy; a detector coupled to said last-mentioned network and adapted to produce a unidirectional control voltage having a polarity opposite that of said first-mentioned control voltage; and means for applying said control voltages to said frequency-varying means, the polarity of said first-mentioned control voltage being such as to urge the peaks of said synchronizing pulses toward the frequency to which said last-mentioned network is most responsive, while the second control voltage acts to prevent any substantial shift of said peaks.

CARL G. SONTHEIMER.

REFERENCES CITED

The following references are of record in the file of this patent:

UNITED STATES PATENTS

| Number | Name | Date |
|---|---|---|
| 2,254,435 | Loughren | Sept. 2, 1941 |
| 2,262,218 | Andrews | Nov. 11, 1941 |
| 2,290,517 | Wilson | July 21, 1942 |
| 2,296,919 | Goldstine | Sept. 29, 1942 |
| 2,305,864 | Gottier | Dec. 22, 1942 |
| 2,330,902 | McCoy | Oct. 5, 1943 |
| 2,344,810 | Fredendall et al. | Mar. 21, 1944 |
| 2,354,827 | Peterson | Aug. 1, 1944 |
| 2,357,984 | Travis | Sept. 12, 1944 |
| 2,481,902 | Bradley | Sept. 13, 1949 |